(12) United States Patent
Christenson et al.

(10) Patent No.: US 8,103,795 B2
(45) Date of Patent: Jan. 24, 2012

(54) TCP/IP HOST NAME RESOLUTION ON A PRIVATE NETWORK

(75) Inventors: David A. Christenson, Fergus Falls, MN (US); Christopher T. Gloe, Rochester, MN (US); Brian E. Jongekryg, Rochester, MN (US); John C. Kasperski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/499,888

(22) Filed: Jul. 9, 2009

(65) Prior Publication Data

US 2011/0010413 A1  Jan. 13, 2011

(51) Int. Cl.
*G06F 13/00* (2006.01)
(52) U.S. Cl. .................. 709/245; 709/238; 709/203
(58) Field of Classification Search .................. 709/245, 709/238, 203
See application file for complete search history.

(56) References Cited

U.S. PATENT DOCUMENTS

| | | | |
|---|---|---|---|
| 6,421,732 B1 * | 7/2002 | Alkhatib et al. | 709/245 |
| 6,463,061 B1 | 10/2002 | Rekhter et al. | |
| 6,563,823 B1 * | 5/2003 | Przygienda et al. | 370/392 |
| 6,834,302 B1 | 12/2004 | Harvell | |
| 7,359,933 B1 | 4/2008 | Polen et al. | |
| 7,496,685 B2 | 2/2009 | Chen et al. | |
| 7,562,153 B2 * | 7/2009 | Biliris et al. | 709/238 |
| 7,633,855 B2 * | 12/2009 | Singh et al. | 370/216 |
| 7,702,808 B2 | 4/2010 | Wiget et al. | |
| 7,797,410 B2 * | 9/2010 | Westerdal | 709/223 |
| 7,904,535 B2 | 3/2011 | Luo et al. | |
| 7,937,471 B2 | 5/2011 | Alkhatib et al. | |
| 2002/0016926 A1 | 2/2002 | Nguyen et al. | |
| 2002/0078233 A1 * | 6/2002 | Biliris et al. | 709/238 |
| 2002/0093915 A1 | 7/2002 | Larson | |
| 2003/0028671 A1 | 2/2003 | Mehta et al. | |
| 2005/0030956 A1 | 2/2005 | Lord et al. | |
| 2005/0286514 A1 | 12/2005 | Cheshire et al. | |
| 2006/0031385 A1 * | 2/2006 | Westerdal | 709/217 |
| 2006/0041650 A1 | 2/2006 | Luo et al. | |
| 2007/0097992 A1 * | 5/2007 | Singh et al. | 370/395.54 |
| 2009/0113521 A1 | 4/2009 | Engdahl et al. | |
| 2010/0325240 A1 * | 12/2010 | Drako et al. | 709/217 |
| 2011/0010463 A1 | 1/2011 | Christenson et al. | |
| 2011/0055374 A1 | 3/2011 | Christenson et al. | |
| 2011/0196945 A1 | 8/2011 | Alkhatib et al. | |

* cited by examiner

*Primary Examiner* — Kenneth R Coulter
(74) *Attorney, Agent, or Firm* — Patterson & Sheridan LLP; James R. Nock (57) ABSTRACT

Systems, methods and articles of manufacture are disclosed for resolving hostnames on a private network with a distributed DNS server configuration. One embodiment of the invention provides for a client resolver configured to communicate with a distributed network of servers. The client resolver receives a hostname query and determines if the hostname query is of the type single label hostname or fully qualified hostname. If the hostname query received is of the type fully qualified hostname, the client resolver routes the hostname query to a server with a longest matching domain suffix. If the hostname query received is of the type single label hostname the client resolver generates one or more new fully qualified hostnames and routes the hostname query to each server on the private network.

24 Claims, 7 Drawing Sheets

DNS ROUTING TABLE ~160

| DOMAIN SUFFIX | DNS SERVER | RECURSIVE |
|---|---|---|
| .ibmb001.ibmb.bluenet | 10.0.1.101 | NO |
| .ibmb002.ibmb.bluenet | 10.0.2.102 | NO |
| .rchland.ibm.com | 9.0.9.1 | YES |
| default | 208.67.222.222 | YES |

TCP/IP HOST NAME RESOLUTION ON A PRIVATE NETWORK

BACKGROUND OF THE INVENTION

1. Field of the Invention

The field of invention relates to hostname resolution. In particular, the field of invention relates to resolving hostnames in a private network.

2. Description of the Related Art

In both public and private computer networks, centralized Domain Name System (DNS) servers are used to locate resources and services on a network. These servers generally store records of hostname-to-IP mappings in a database. Often, the challenge for small and mid-sized businesses that implement a private network is that centralized DNS server set-up and maintenance can be costly and time consuming. Nonetheless, a database of hostname-to-IP mappings is generally necessary for client computers on the private network to connect to local applications on the private network like email, chat, or a database for example.

Despite various techniques currently available to handle hostname resolution, there remains a need for an improved hostname resolution system that does not require a centralized DNS server, that makes use of static IP addresses, and that spans multiple local area network (LAN) segments.

SUMMARY OF THE INVENTION

One embodiment of the invention includes a computer implemented method for resolving hostnames on a private network with a distributed DNS server configuration. The operation may generally include receiving a hostname query on a client computer; wherein the client computer is configured to store one or more domain suffix records and an associated IP address for each of the one or more domain suffix records; determining if the hostname query is of the type single label hostname or of the type fully qualified hostname; and routing the hostname query to a server with a longest matching domain suffix if the hostname query received is of the type fully qualified hostname; wherein the server manages a database of hostnames and associated IP addresses.

Another embodiment of the invention includes a computer readable storage medium containing a program which, when executed, performs an operation for resolving hostnames on a private network with a distributed DNS server configuration. The operation may generally include receiving a hostname query on a client computer; wherein the client computer is configured to store one or more domain suffix records and an associated IP address for each of the one or more domain suffix records; determining if the hostname query is of the type single label hostname or of the type fully qualified hostname; routing the hostname query to a server with a longest matching domain suffix if the hostname query received is of the type fully qualified hostname; wherein the server manages a database of hostnames and associated IP addresses.

Still another embodiment of the invention includes a system having a processor; and a memory containing a program, which when executed by the processor is configured to perform an operation for resolving hostnames on a private network with a distributed DNS server configuration. The operation may generally include receiving a hostname query on a client computer; wherein the client computer is configured to store one or more domain suffix records and an associated IP address for each of the one or more domain suffix records; determining if the hostname query is of the type single label hostname or of the type fully qualified hostname; and routing the hostname query to a server with a longest matching domain suffix if the hostname query received is of the type fully qualified hostname; wherein the server manages a database of hostnames and associated IP addresses.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF THE PREFERRED EMBODIMENTS

Embodiments of the present invention generally provide for a system and method for resolving hostnames on a private network with a distributed DNS server configuration. One embodiment of the invention provides for a client resolver configured to communicate with a distributed network of servers. Unlike alternative systems that rely solely on the use of local files on the client computer, the embodiments herein described minimize maintenance.

For example, the embodiments described herein address the issues raised by networks configured to store HOSTS files on every client computer, wherein the HOSTS file lists hostnames and corresponding IP addresses to networked devices. Such configurations become impractical alternative as the number of networked devices on the private network increase from only a few devices to hundreds of devices. Synchronizing hundreds of client HOSTS files is a difficult task and changing a single IP address can be very disruptive.

The embodiments described herein also address problems raised by alternative techniques for minimizing IP addresses maintenance, such as dynamic DNS. Dynamic DNS provides the capability for a networked device to temporarily lease an IP address from a Dynamic Host Configuration Protocol (DHCP) server. The DHCP server updates the centralized DNS server with the leased IP addresses and is also often responsible for tracking the DNS server IP address and communicating that DNS server IP address to the networked device. However, this solution is also often impracticable because applications stored on the networked device generally require a static IP address and are not configured to request IP addresses from the DHCP server.

Further, embodiments of the present invention also address problems raised by multicast DNS. Multicast DNS is yet another alternative that enables non-technical users to connect network devices on a private network with a distributed DNS configuration. Each network device on the private network stores a local copy of its own hostname-to-IP mapping and discovers new IP addresses for unknown hostnames by broadcasting the unknown hostname, often referred to as IP multicast, and waiting for a response from the network device with a matching hostname. A significant limitation of multicast DNS is that hostname resolution can only be done on a shared LAN segment making it unsuitable for most small to mid-size business networks.

Figure 1A:
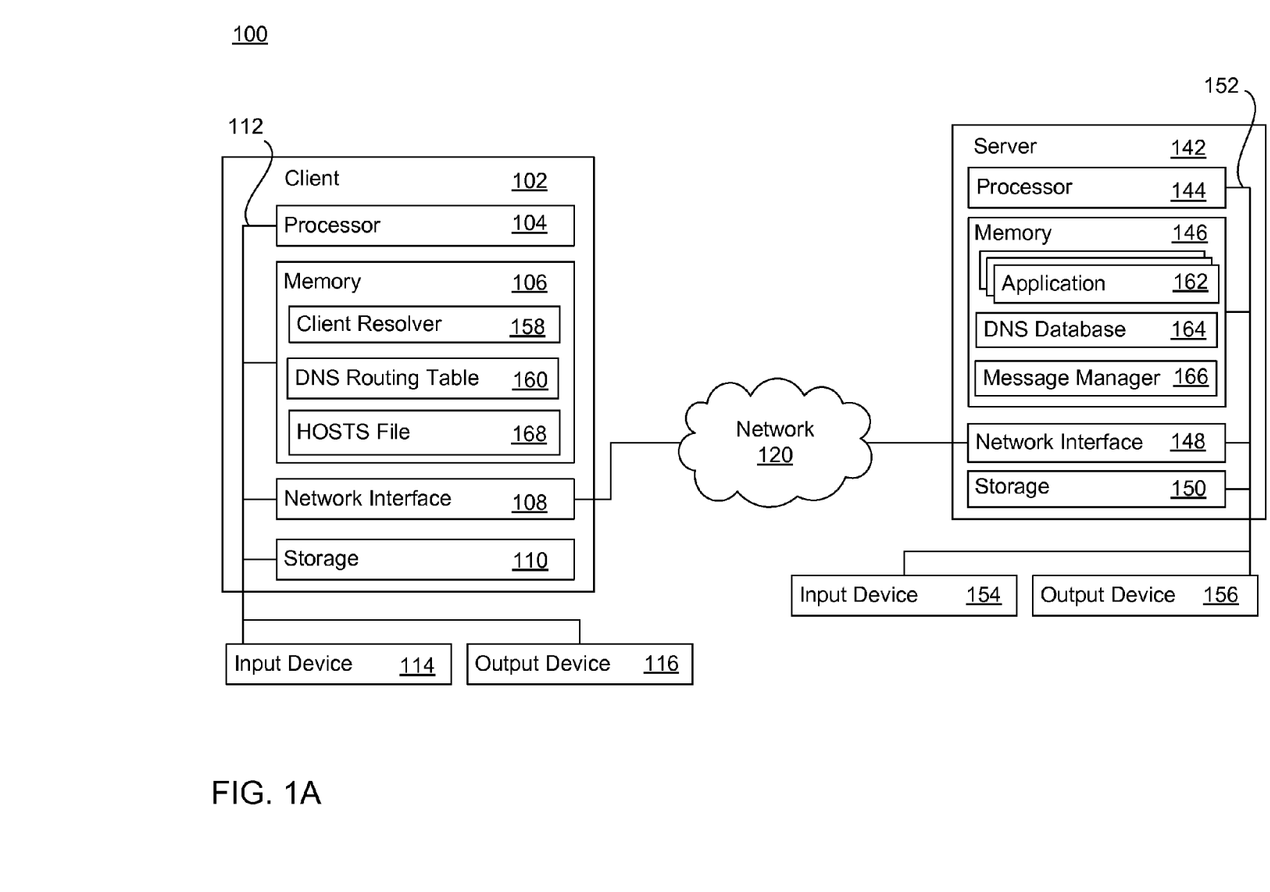
FIG. 1A is a block diagram illustrating an embodiment of a system for resolving hostnames, according to one embodiment of the invention.
Figure 2:
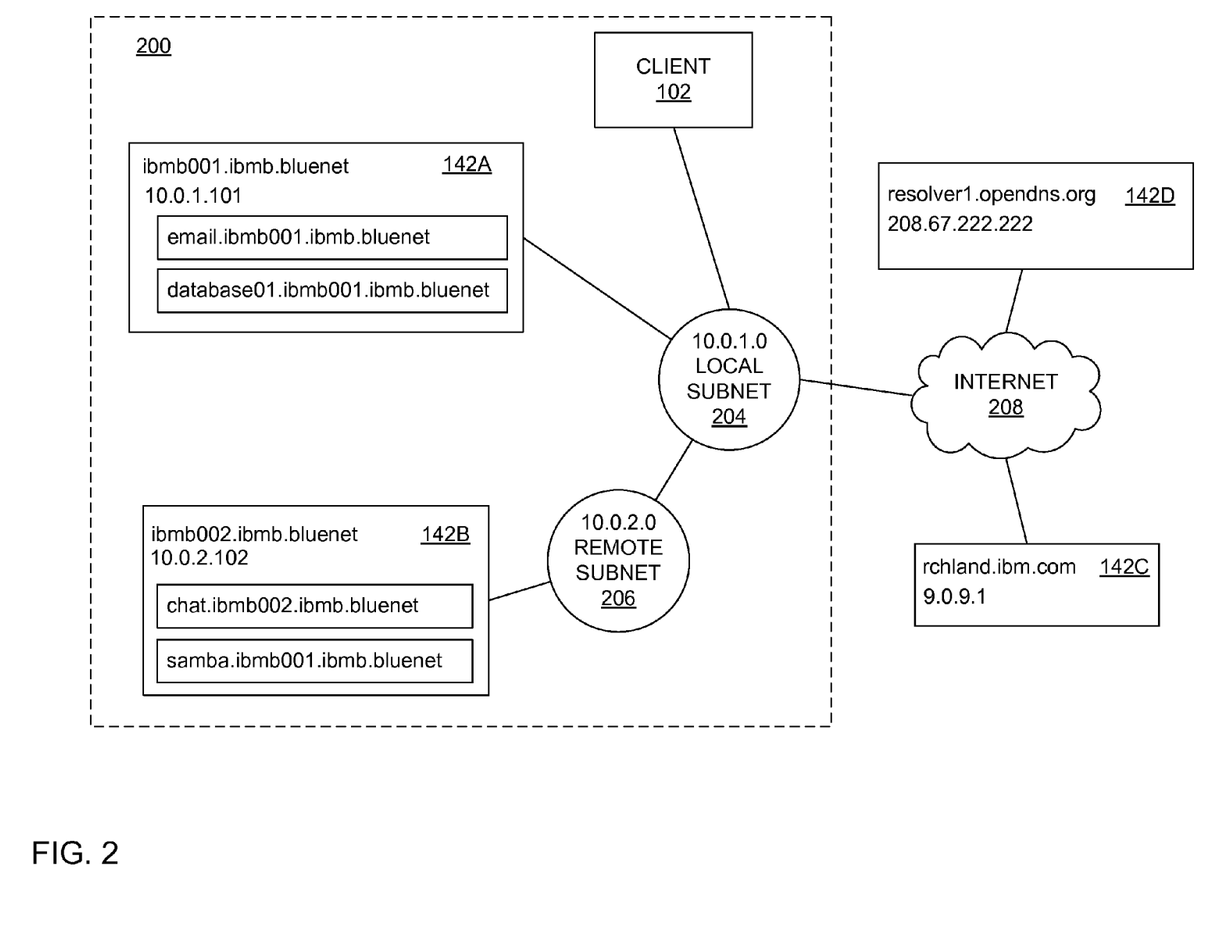
FIG. 2 is a detailed description of the DNS database stored on a private network server, according to one embodiment of the invention.

FIG. 1A is a block diagram illustrating a system 100 for resolving hostnames, according to one embodiment of the invention. The networked system 100 includes a client computer 102 (client) and a server computer 142 (server). The client 102 and the server 142 are connected via a network 120. In a particular embodiment, the network 120 is a private network with a distributed DNS server configuration as illustrated in FIG. 2.

The client 102 generally includes a processor 104 connected via a bus 112 to a memory 106, a network interface device 108, a storage 110, an input device 114, and an output device 116. The client 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a client resolver 158, a DNS routing table 160, and a HOSTS file 168. The client resolver 158, when executed on processor 104, retrieves information associated with a received hostname query by making use of the DNS routing table 160 as described in further detail in FIG. 1C. In an alternative embodiment, the DNS server list 160 and the HOSTS file 168 are stored in storage 110.

The network interface device 108 may be any entry/exit device configured to allow network communications between the client 102 and the server 142 via the network 120. For example, the network interface device 108 may be a network adapter or other network interface card (NIC).

The storage 110 may be a hard disk drive storage device. Although the storage 110 is shown as a single unit, the storage 110 may be a combination of fixed and/or removable storage devices, such as fixed disc drives, floppy disc drives, tape drives, removable memory cards, or optical storage. The memory 106 and the storage 110 may be part of one virtual address space spanning multiple primary and secondary storage devices.

The input device 114 may be any device for providing input to the client 102. For example, a keyboard, keypad, light pen, touch-screen, track-ball, or speech recognition unit, audio/video player, and the like may be used.

The output device 116 may be any device for providing output to a user of the client 102. For example, the output device 116 may be any conventional display screen or set of speakers, along with their respective interface cards, i.e., video cards and sound cards.

The server 142 generally includes a processor 144 connected via a bus 152 to a memory 146, a network interface device 148, a storage 150, an input device 154, and an output device 156. The processor 144 could be any hardware processor used to perform an embodiment of the invention.

Like the memory 106, the memory 146 may be a random access memory sufficiently large to hold the necessary programming and data structures of the invention. The programming and data structures may be accessed and executed by the processor 144 as needed during operation. While the memory 146 is shown as a single entity, it should be understood that the memory 146 may in fact comprise a plurality of modules, and that the memory 146 may exist at multiple levels, from high speed registers and caches to lower speed but larger DRAM chips.

As shown, the memory 146 includes one or more hosted applications 162, available to one or more clients 102 on the private network. In addition, as shown, the memory includes a message manager 166 as described in further detail in FIG. 1D and a DNS database 164, wherein each DNS database 164 includes a list of application hostnames for applications installed on the server 142. In an alternative embodiment, the DNS database 164 is stored in storage 150.

Like the network interface device 108, the network interface device 148 may be any entry/exit device configured to allow network communications between the client 102 and the server 142 via the network 120. For example, the network interface device 148 may be a network adapter or other network interface card (NIC).

Like the storage 110, the storage 150 may be a hard disk storage device. Although the storage 150 is shown as a single unit, the storage 150 may be a combination of fixed and/or removable storage devices, such as fixed disc drives, floppy disc drives, tape drives, removable memory cards, or optical storage. The memory 146 and the storage 150 may be part of one virtual address space spanning multiple primary and secondary storage devices.

Like the input device 114, the input device 154 may be any device for providing input to the client 102. For example, a keyboard, keypad, light pen, touch-screen, track-ball, or speech recognition unit, audio/video player, and the like may be used.

Like the output device 116, the output device 156 may be any device for providing output to a user of the server 142. For example, the output device 156 may be any conventional display screen or set of speakers, along with their respective interface cards, i.e., video cards and sound cards.

Figure 1B:
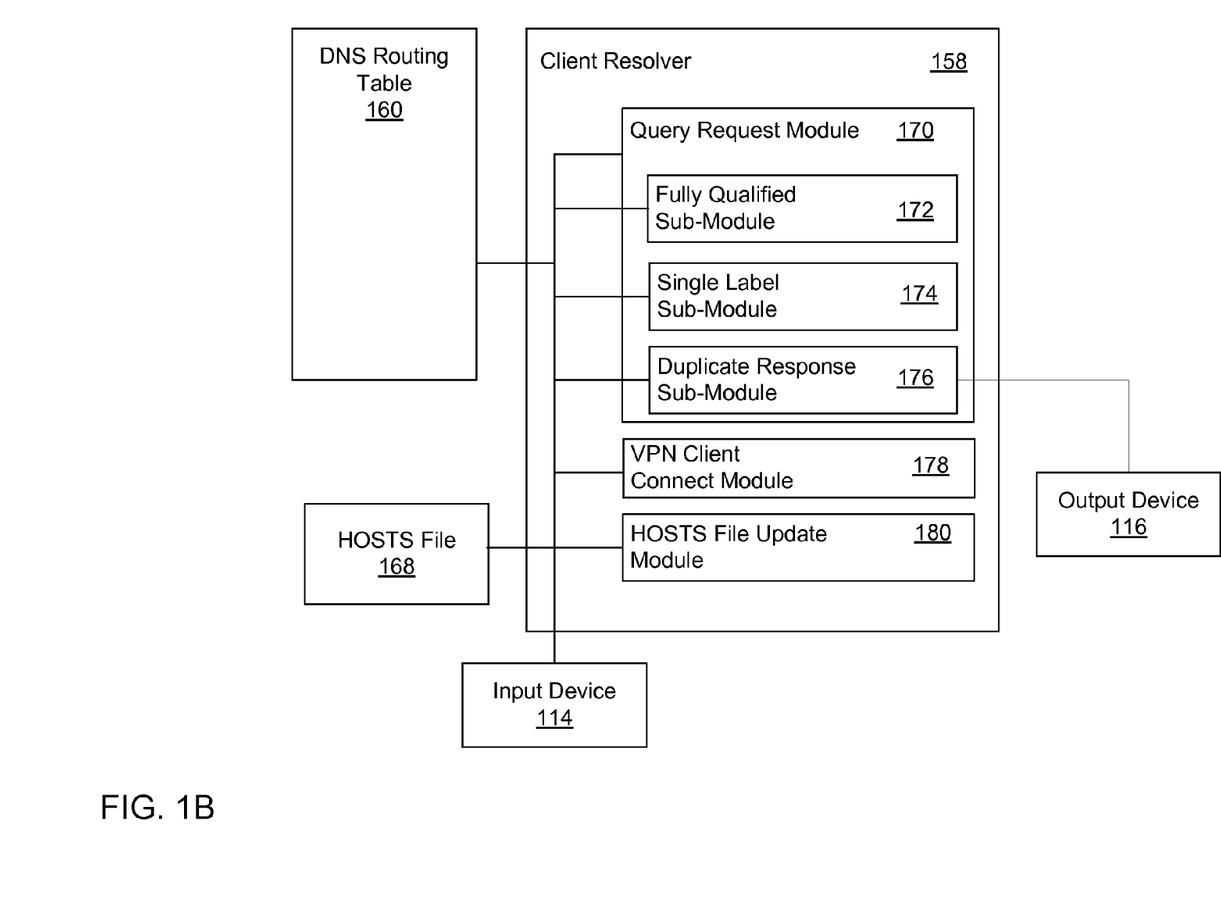
FIG. 1B is a block diagram illustrating a functional view of the client resolver, according to one embodiment of the invention.

FIG. 1B is a block diagram illustrating a functional view of the client resolver 158, according to one embodiment of the invention. As shown the client resolver 158 includes a query request module 170, wherein the query request module 170 includes a fully qualified sub-module 172, a single label sub-module 174, and a duplicate response sub-module 172. The client resolver 158 also includes a virtual private network (VPN) client connect module 178 and a HOSTS file update module 180.

In one embodiment, the query request module 170 is configured to receive DNS query requests via the input device 114, wherein a DNS query request includes a hostname. The query request module 170 is further configured to check the HOSTS file 168, wherein the HOSTS file 168 is cached, to determine if the received hostname matches a hostname-to-IP mapping in the HOSTS file 168. If YES, the query request module 170 is configured to return the IP address that maps to the hostname. If NO, the query request module 170 is configured to further process the received hostname to determine if the hostname is a fully qualified hostname or a single label hostname.

The fully qualified hostname includes a local hostname and a domain suffix. For example, the hostname chat.ibmb001.ibmb.bluenet is comprised of the local hostname "chat" and the domain suffix "ibmb001.ibmb.bluenet." Alternatively, the single label hostname only includes the local hostname. For example, a hostname that only includes "chat" is a single label hostname. If the hostname is of the type fully qualified hostname the query request module 170 is configured to send the hostname to the fully qualified sub-module 172. If the hostname is of the type single label hostname the query request module 170 is configured to send the hostname to the single label sub-module 174.

In one embodiment, the fully qualified sub-module 172 is configured to receive the fully qualified hostname and check the DNS routing table 160 to determine if the domain suffix in the fully qualified hostname matches a domain suffix in the DNS routing table 160. The fully qualified sub-module 172 is configured to send a query to the DNS server with the longest matching domain suffix. In particular, if the fully qualified sub-module 172 identifies a matching domain suffix, the fully qualified sub-module 172 is configured to send a query to the DNS server associated with the domain suffix using the IP address that maps to the domain suffix. The client resolver 158 is configured to receive a positive or a negative response to the query sent from the fully qualified sub-module 172. If the fully qualified sub-module 172 is unable to identify a domain suffix in the DNS routing table 160 that matches the received fully qualified hostname, the fully qualified sub-module 172 is configured to send a query to the default DNS server as provided in the DNS routing table 160. Additional detail on the structure and contents of the DNS routing table 160 is provided in FIG. 1C and associated descriptions. If the domain suffix in the DNS routing table 160 is associated with a server outside of the private network, the fully qualified hostname and the associated IP address are sent to the VPN client connect module 178.

In one embodiment, the single label sub-module 174 is configured to receive a single label hostname. The single label sub-module 174 is further configured to send a query to each server in the DNS routing table 160. The query includes a fully qualified hostname generated by the single label sub-module 174. In particular, the query includes a single label hostname appended to the receiving server's domain suffix. For example, if the single label sub-module 174 receives the single label hostname "email", the single label sub-module 174 appends "email" to each domain suffix in the DNS routing table 160. If the single label sub-module 174 sends a query to a server associated with the domain suffix ".ibmb001.ibmb.bluenet", the single label sub-module 174 creates the fully qualified hostname "email.ibmb001.ibmb.bluenet" and includes the fully qualified hostname in the query. The single label sub-module is configured to repeat the process for each domain suffix in the DNS routing table 160. If the domain suffix in the DNS routing table 160 is associated with a server outside of the private network, the fully qualified hostname and the associated IP address are sent to the VPN client connect module 178.

In one embodiment the single label sub-module 174 is configured to send the query requests to each server in the DNS routing table 160 in series. In an alternative embodiment, the single label sub-module 174 is configured to send the query requests in parallel. The client resolver 158 is configured to receive a positive or a negative response to the query sent from the single label sub-module 174. If the client resolver 158 receives two or more positive responses from servers on the private network, the client resolver 158 is configured to send the IP address associated with each positive response to the duplicate response sub-module 176.

In one embodiment, the duplicate response sub-module 176 is configured to receive two or more IP addresses. The duplicate response sub-module 176 may be further configured to select a preferred IP address to return to the client. In one embodiment, the preferred IP address is determined by a user. In such an embodiment, the duplicate response sub-module 176 is configured to notify the client of the duplicate responses via the output device 116. The duplicate response sub-module 176 may be further configured to receive a preference request from a user via the input device 114, wherein the preference request indicates to the client resolver 158 the preferred server for sending ongoing communication.

In an alternative embodiment, the preferred IP address is determined by the duplicate response sub-module 176. In such an embodiment, the duplicate response sub-module 176 is configured to determine if the received IP addresses are associated with the same application replicated on two different servers on the private network. In particular, the duplicate response sub-module 176 is configured to query each of the received IP address for an application ID and date of installation. The duplicate response sub-module 176 is configured to receive a response with an application ID from each IP address. The duplicate response sub-module 176 is configured to compare the application IDs and if the application IDs are the same, the duplicate response sub-module 176 is further configured to compare the dates. The duplicate request sub-module 176 is configured to select the IP address associated with the most recently installed application as the preferred IP address based on date of installation. If the application IDs are different the duplicate response sub-module 176 is configure to prompt a user for a preferred IP address.

In yet another embodiment the duplicate response sub-module 176 is configured to return all of the received IP addresses to the client.

In one embodiment, the VPN client connect module 178 is configured to receive a fully qualified hostname and an associated IP address for a server outside of the private network. The VPN client connection module 178 is configured to forward the fully qualified hostname and IP address to a VPN client on the client.

In one embodiment, the HOSTS file update module 180 is configured to track all positive and negative responses from queried DNS servers. If positive, the HOSTS file update module 180 is configured to record the associated hostname-to-IP mapping in the cached HOSTS file along with a default expiration if the response. If negative, the HOSTS file update module is configured to delete a hostname-to-IP mapping if the hostname-to-IP mapping is in the HOSTS file.

Figure 1C:
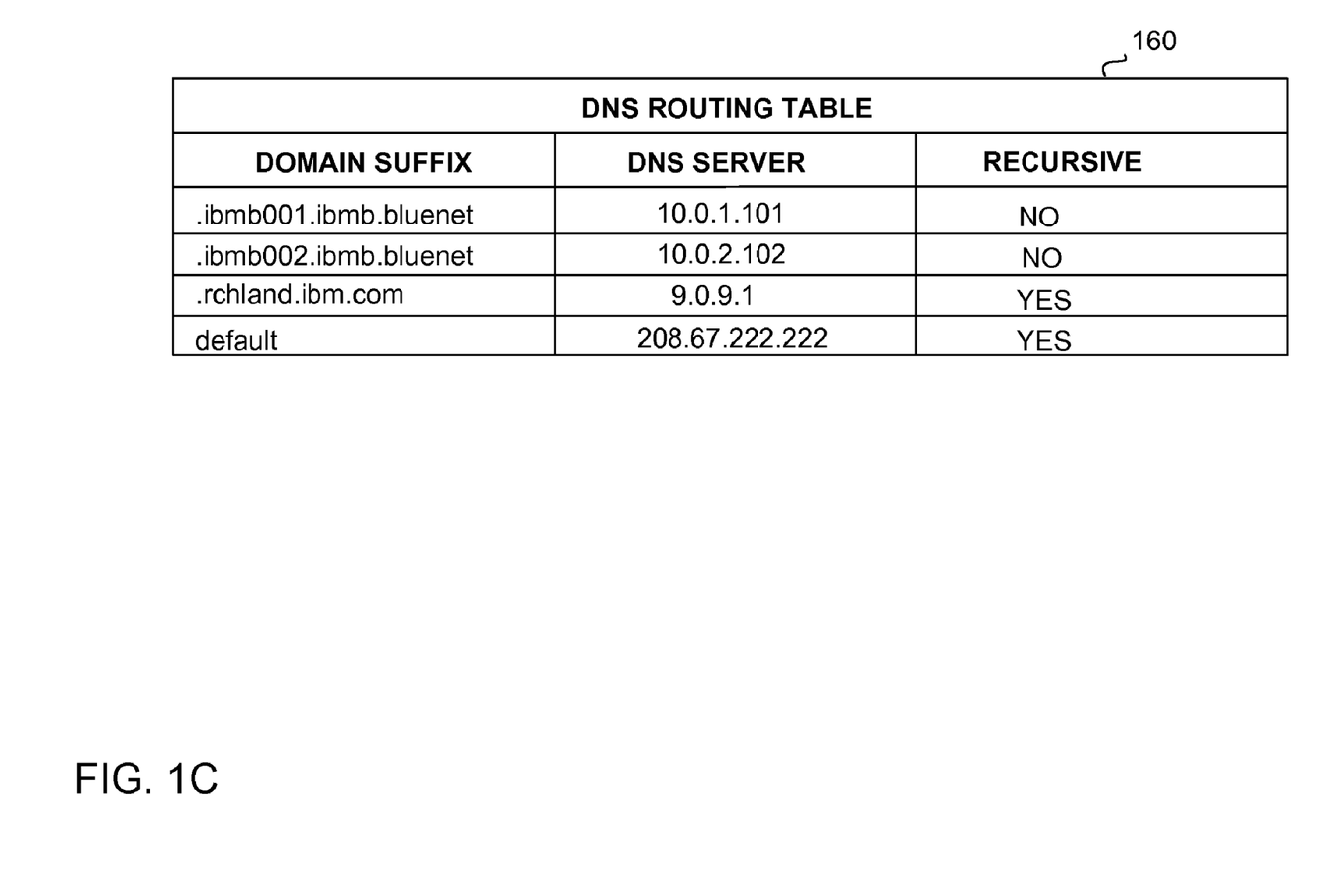
FIG. 1C is a detailed description of a DNS routing table, according to one embodiment of the invention.

FIG. 1C is a detailed description of the DNS routing table 160, according to one embodiment of the invention. The DNS routing table 160 is configured to include a list of domain suffix records, an associated IP address for each domain suffix record, and a recursive query flag for each domain suffix record. The client resolver 158 is configured to determine whether to send a recursive or non-recursive DNS query to the server associated with the domain suffix record based on whether the recursive query flag is set to YES or NO, respectively, wherein a recursive query is a request to the receiving server to query other servers in search of an IP address. In addition, the DNS routing table 160 may be configured to store the IP address of a public domain name server as an additional resource to the client resolver 158, enabling access to servers outside of the private network.

In one embodiment, the DNS routing table 160 is configured to set the recursive query flag set to NO, indicating that the server should not query other servers, if the domain name suffix is associated with a server in the private network. In contrast, the DNS routing table 160 is configured to set the recursive query flag to YES, indicating that the server should query other servers, if the domain name suffix is associated with a server outside of the private network.

Figure 1D:
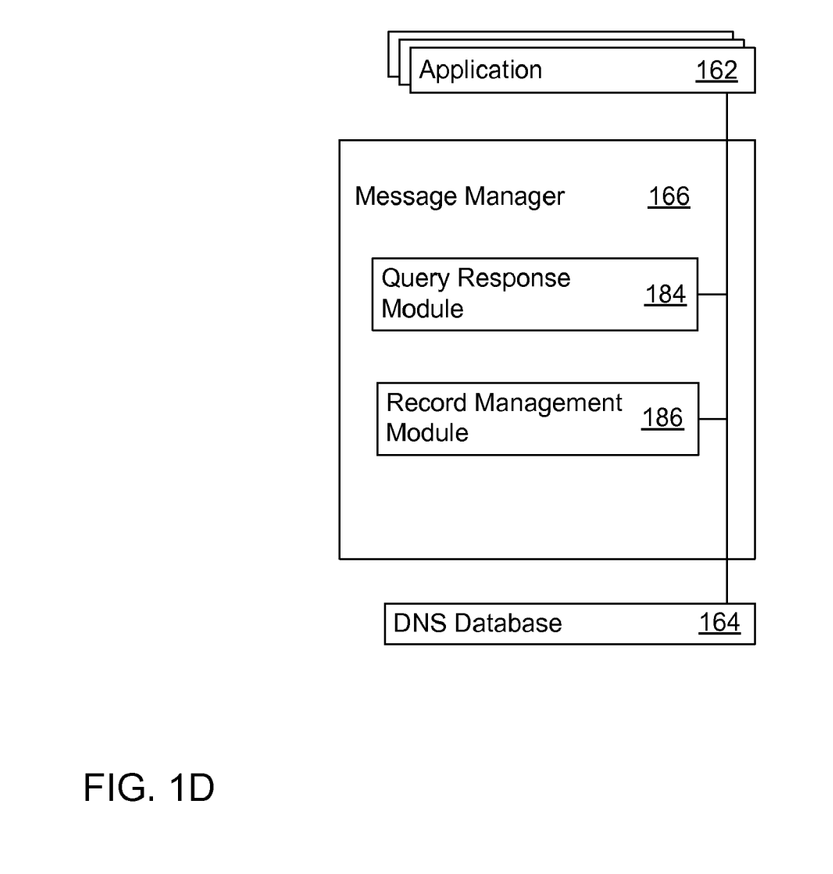
FIG. 1D is a block diagram illustrating a function view of the message manager, according to one embodiment of the invention.

FIG. 1D is a block diagram illustrating a functional view of the message manager 166, according to one embodiment of the invention. As shown, the message manager 166 includes a query response module 184 and a record management module 186.

In one embodiment, the query response module 184 is configured to receive a DNS query request from a client on the private network, wherein the DNS query request includes a hostname, and is configured to determine if the requested hostname is stored in the DNS database 164. If YES, the query response module 184 returns the associated IP address that maps to the hostname. If NO, the query response module 184 returns a domain not found error. In an alternative embodiment, the query response module may be configured to send an IP address that maps to a hostname located on an alternative server on the private network. In such an embodiment, the DNS database 164 is configured to store hostname-to-IP mappings for non-locally hosted applications.

In one embodiment, the record management module 186 generates records in the DNS database 164 and deletes records from the DNS database 164. In particular, as applications are installed and uninstalled, the record management module 186 is configured to update the list of application hostnames in the DNS database 164 so that an application hostname is added to the DNS database 164 when the application is installed and is removed from the DNS database 164 when the application is uninstalled. In addition, the record management module 186 is configured to add and remove network interface hostnames the DNS database 164 as new network interfaces are created and deleted, respectively.

Additionally, the record management module 186 may be configured to use the application names to construct the application hostname taking the form: <application name>.<domain suffix>. For example, an application installed on a server, ibmb001, with the application name "chat" is appended to the domain suffix associated with ibmb001, "ibmb001.ibmb.bluenet", to form "chat.ibmb001.ibmb.bluenet." In addition, the record management module 186 is configured to assign a unique identifier to each application not requiring a particular hostname. The record management module 186 is further configured to append the unique identifier to the domain suffix associated with the server.

In an alternative embodiment, the record management module 186 is configured to structure the hostname-to-IP mappings on the DNS database 164 as a zone file resource record, as defined in the DNS specification RFC 1035 section 5 and RFC 1034 section 3.6.1 available at http://www.ietf.org/rfc/rfc1035.txt and http://www.ietf.org/rfc/rfc1034.txt respectively. Table I provides an illustrative example of a zone file:

TABLE I

| Zone File Example | | | |
|---|---|---|---|
| $ORIGIN | ibmb001 .ibmb.bluenet | | ; start of zone file |
| ibmb.bluenet. | IN SOA | ibmb001 .ibmb.bluenet. root.ibmb.bluenet ( | |
| 2009120710 ) | | | ; serial number of this zone file |
| $TTL | 1h | | ; default expiration of a resource record |
| ibmb001 | A | 10.0.1.101 | ; ip address for "ibmb001 .ibmb.bluenet" |
| database01 | CNAME | ibmb001 | ; "database01" is an alias for "ibmb001" |
| email | CNAME | ibmb001 | ; "email" is an alias for "ibmb001" |

The zone file includes the default expiration of a resource record, referred to as "time to live" (TTL), indicating the length of time a zone record is valid. The zone file also includes a "Start of Authority" (SOA) record indicating the name of the primary authoritative name server for the zone and the email address of the administrator. The zone file also includes hostname-to-IP mappings and may include records of hostname aliases. Hostnames that do not end in a period in the zone file are assumed to be relative to the zone origin. The server may also include a reverse zone file that maps IP addresses to hostnames, wherein hostnames includes primary hostname, secondary hostname, and application hostnames.

FIG. 2 is a block diagram illustrating an example of an embodiment of a private network 200 with a distributed DNS server configuration. The private network 200 is a variation of the networked system illustrated in FIG. 1A. The private network 200 includes the client 102 of FIG. 1A connected via a network to a plurality of servers, wherein each server 142 is configured as detailed in FIG. 1A.

The private network includes server ibmb001.ibmb.bluenet 142A (ibmb001), wherein server ibmb001 hosts applications and is associated with IP address 10.0.1.101, and server ibmb002.ibmb.bluenet 142B (ibmb002), wherein server ibmb002 also hosts applications and is associated with IP address 10.0.2.102. Server ibmb001 is connected to the client 102 via local subnet 204 and server ibmb002 142B is connected to the client 102 via remote subnet 206. The private network also includes a network connection to server rchland.ibm.com 142C (rchland), associated with IP address 9.0.9.1, and default DNS server resolver1.opendns.org 142D (default DNS server), associated with IP address 208.67.222.222, connected via the Internet 208 via local subnet 204.

The client 102 routes DNS hostname queries directly to one or more of the plurality of servers. In addition, the client 102 is configured to route hostname queries to servers accessible only via VPN tunnels. For example, server "rchland" 142C is accessible via a VPN tunnel. The client routes queries to server "rchland" 142C to IP address "9.0.9.1", wherein IP address "9.0.9.1" is redirected to a VPN DNS server and subsequently routed to server "rchland" 142C.

As detailed in FIG. 1A, each server manages a self contained DNS database for applications hosted on the server. For example, in FIG. 2, server "ibmb001" 142A hosts an email application and a database as indicated by the hostnames, "email.ibmb001.ibmb.bluenet" and "database01.ibmb001.ibmb.bluenet", respectively. Server "ibmb002" 142B hosts an email application and a file server application ("samba").

In the above described embodiment, duplicate instances of the same application hostname may be stored in two or more DNS databases. For example, a user may replicate database01 from server ibmb001 to server ibmb002. Upon installing replicate database01 on ibmb002, the system is configured to automatically add the hostname associated with the replicated application, database01, to the DNS database 164 on server ibmb002 142B. A hostname query sent from the client 102 results in duplicate responses from server ibmb001 142A and server ibmb002 142B eliminating application downtime. Upon uninstalling database01 from ibmb001, the system is configured to automatically remove the hostname database01 from the DNS database.

Figure 3A:
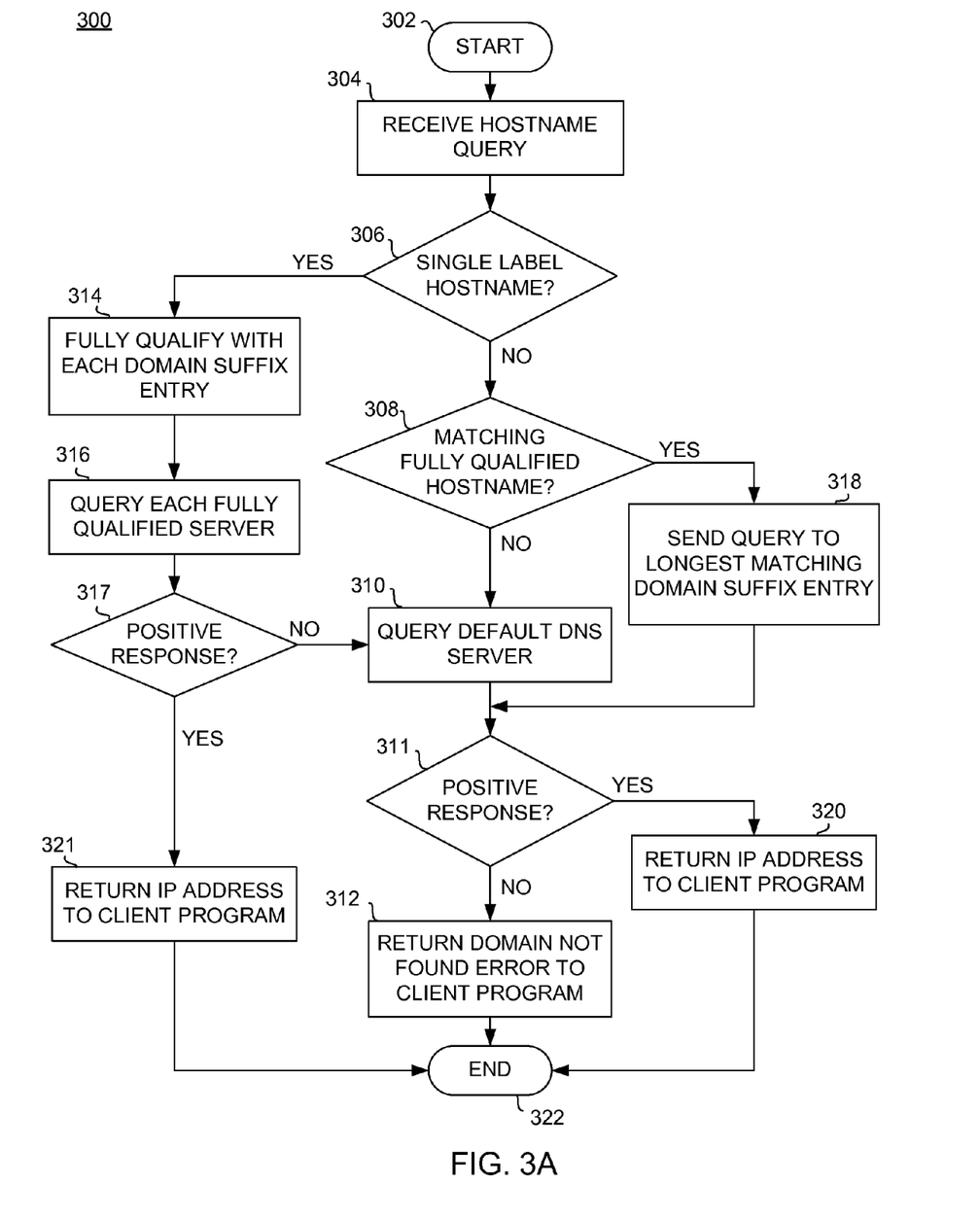
FIG. 3A is a flow chart illustrating, in general, a process of a system for resolving hostnames in a private network with a distributed DNS server configuration.

FIG. 3A is a flow chart 300 illustrating, in general, a process of a system for resolving hostnames in a private network with a distributed DNS server configuration. In particular, the process illustrates a system for querying servers on the private network wherein the server acts both as a DNS server and an application server. In one embodiment the system performing the process is the client resolver 158 of FIG. 1.

As shown, the process begins at block 302. At block 304, the system receives a hostname query. At block 306, the system determines if the hostname is a single label hostname. If YES, the system qualifies the single label hostname with each of the domain suffix records 314 stored in the DNS routing table 160 of FIG. 1 and control passes to block 316. If NO, control passes to block 308.

At block 316, the system sends a query to each fully qualified server and control passes to block 317. At block 317, the system determines if a positive response is received, wherein no response is determined to be a negative response and wherein a positive response includes an IP address that maps to the received hostname query. If YES, the system returns the IP address to the client program 321 and control passes to block 322, the end of process 300. If NO, control passes to block 310.

At block 308, the system determines if there is a matching fully qualified hostname. If NO, control passes to block 310. If YES, the system sends a query to the server with the longest matching domain suffix record 318 and control passes to block 311.

At block 310, the system sends a query to the default DNS server and control passes to block 311. At block 311, the system determines if the response is positive. If YES, the system returns the IP address to the client program 320 and control passes to block 322 the end of process 300. If NO, the system returns a domain not found error to the client program 312 and passes control to block 322, the end of process 300.

Figure 3B:
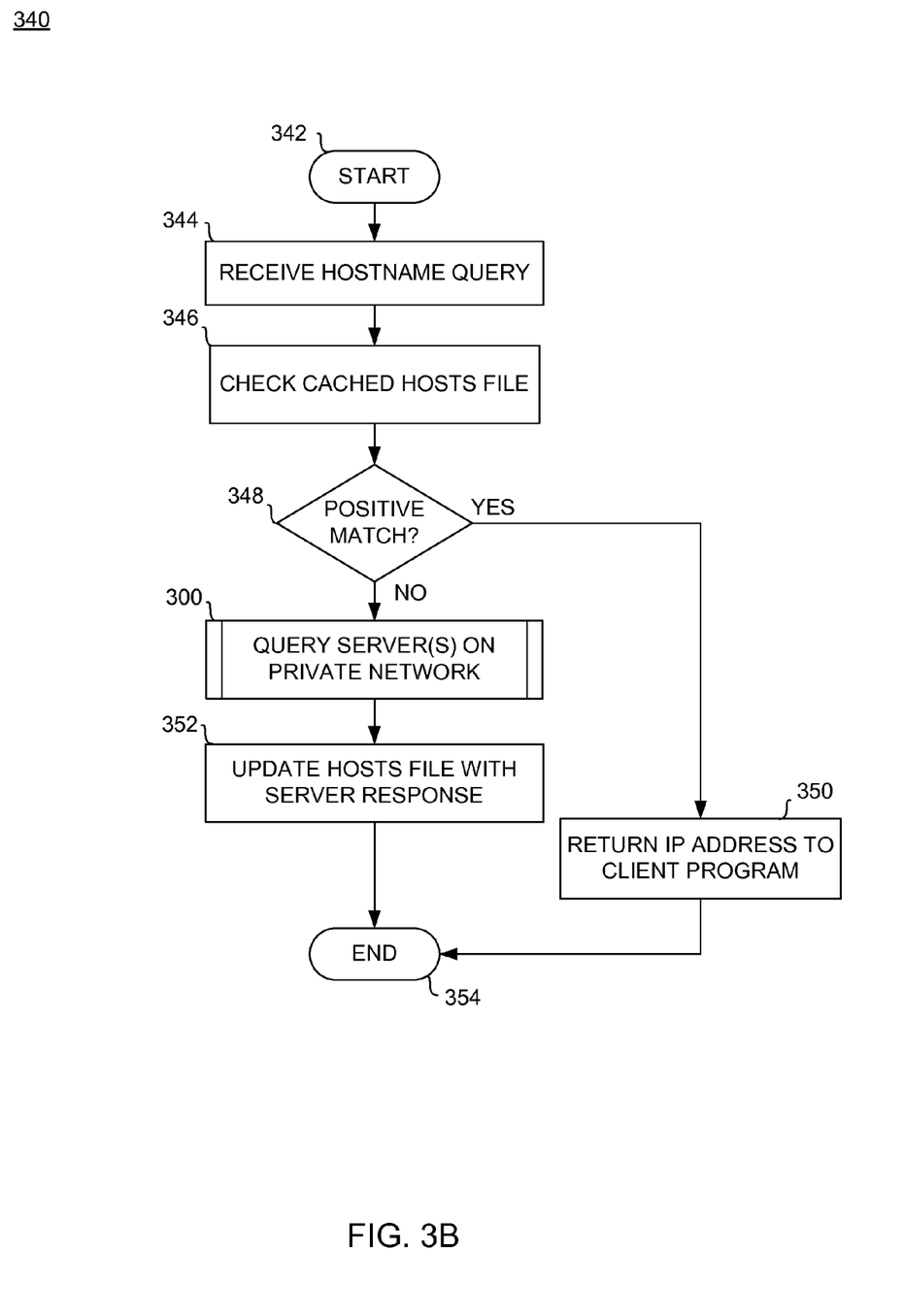
FIG. 3B illustrates an alternative embodiment to FIG. 3A, wherein the system caches positive and negative responses from each server and wherein the system queries the cache prior to querying the private network servers.

FIG. 3B illustrates an alternative embodiment to FIG. 3A, wherein the system caches positive and negative responses from each server in a HOSTS file for a specified period of time (TTL) and wherein the system examines the cached responses prior to querying the private network servers, shown generally at 340.

As shown, the process begins at block 342. At block 344 the system receives a hostname query. At block 346, the system checks the cached HOSTS file for a match between the received hostname query and previous responses stored in the HOSTS file. At block 348, the system determines if there is a match between the received hostname query and the records in the HOSTS file. If YES, the system returns the IP address to the client program at block 350 and control passes to block 354, the end of process 340. If NO, the system queries servers on the private network at block 300 (see figure), wherein the system resolves the received hostname query pursuant to the process described in FIG. 3A. The system uses the server response resulting from the process at block 300 to update the HOSTS file at step 352. After block 352, control passes to block 354, the end of process 340.

In an alternative embodiment the system periodically checks the HOSTS file and deletes the server response from the HOSTS file at TTL expiration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the aforementioned, reference is made to private network servers, including distributed DNS servers on the private network. Those skilled in the art will appreciate that the private network servers described in the embodiments herein may serve multiple purposes, such that each server may manage domain names and host applications. In other words, at the very least, the private network servers described herein may function both as an application server and as a DNS server.

In addition, reference is made to a local subnet. It should be understood that the term local subnet is used interchangeably with the term LAN segment to mean that portion of a local area network wherein every device communicates using the same physical layer. Further, repeated reference is made to the private network. Those skilled in the art will appreciate that the networked devices in the private network may communicate with networked devices outside of the private network. Further, those skilled in the art will appreciate that aspects of the embodiments of the invention described herein may transcend the private network and work equally well in a WAN.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for resolving hostnames on a private network with a distributed DNS server configuration, comprising configuring one or more processors to perform an operation, comprising:
   receiving a hostname query on a client computer;
      wherein the client computer is configured to store one or more domain suffix records and an associated IP address that maps to each of the one or more domain suffix records;
   determining if the hostname query is of the type single label hostname or of the type fully qualified hostname;
   routing the hostname query to a server with a longest matching domain suffix if the hostname query received is of the type fully qualified hostname; and
   generating one or more new fully qualified hostnames if the hostname is of the type single label hostname.

2. The computer implemented method of claim 1, wherein each of the new fully qualified hostnames is generated by appending the received hostname, of the type single label hostname, with each domain suffix record on the client computer.

3. The computer implemented method of claim 2, further comprising:
   routing the hostname query to each server on the private network if the hostname is of the type single label hostname;
      wherein the hostname query is routed to each server on the private network according to the IP address associated with the domain suffix of the new fully qualified hostname.

4. The computer implemented method of claim 3, further comprising:
   receiving a response to the hostname query from a server;
      wherein the response from the server includes either a positive response or a negative response;
      wherein no response is determined to be a negative response; and
      wherein a positive response includes an IP address that maps to the received hostname query.

5. The computer implemented method of claim 4, wherein the positive response and the negative response are cached in a HOSTS file for a specified time period.

6. The computer implemented method of claim 4, wherein the response to the hostname query is a duplicate response, wherein the duplicate response is a positive response from two or more servers with replicated applications.

7. The computer implemented method of claim 6, further comprising selecting a preferred IP address if a duplicate response is received.

8. The computer implemented method of claim 7, further comprising:
identifying, from the two or more servers, the server with the most recently installed replicated application; and
selecting an IP address associated with the most recently installed replicated application as the preferred IP address.

9. A non-transitory computer readable storage medium containing a program which, when executed, performs an operation for resolving hostnames on a private network with a distributed DNS server configuration, comprising:
receiving a hostname query on a client computer;
wherein the client computer is configured to store one or more domain suffix records and an associated IP address for each of the one or more domain suffix records;
determining if the hostname query is of the type single label hostname or of the type fully qualified hostname;
routing the hostname query to a server with a longest matching domain suffix if the hostname query received is of the type fully qualified hostname; and
generating one or more new fully qualified hostnames if the hostname is of the type single label hostname.

10. The computer readable storage medium of claim 9, wherein each of the new fully qualified hostnames is generated by appending the received hostname, of the type single label hostname, with each domain suffix record on the client computer.

11. The computer readable storage medium of claim 10, further comprising:
routing the hostname query to each server on the private network if the hostname is of the type single label hostname;
wherein the hostname query is routed to each server on the private network according to the IP address associated with the domain suffix of the new fully qualified hostname.

12. The computer readable storage medium claim 11, further comprising:
receiving a response to the hostname query from a server;
wherein the response from the server includes either a positive response or a negative response;
wherein no response is determined to be a negative response; and
wherein a positive response includes an IP address that maps to the received hostname query.

13. The computer readable storage medium of claim 12, wherein the positive response and the negative response are cached in a HOSTS file for a specified time period.

14. The computer readable storage medium of claim 12, wherein the response to the hostname query is a duplicate response, wherein the duplicate response is a positive response from two or more servers with replicated applications.

15. The computer readable storage medium of claim 14, further comprising:
selecting a preferred IP address if a duplicate response is received.

16. The computer readable storage medium of claim 15, further comprising:
identifying, from the two or more servers, the server with the most recently installed replicated application; and
selecting an IP address associated with the most recently installed replicated application as the preferred IP address.

17. A system, comprising:
a processor; and
a memory containing a program, which when executed by the processor is configured to perform an operation for resolving hostnames on a private network with a distributed DNS server configuration, comprising:
receiving a hostname query on a client computer;
wherein the client computer is configured to store one or more domain suffix records and an associated IP address for each of the one or more domain suffix records;
determining if the hostname query is of the type single label hostname or of the type fully qualified hostname;
routing the hostname query to a server with a longest matching domain suffix if the hostname query received is of the type fully qualified hostname; and
generating one or more new fully qualified hostnames if the hostname is of the type single label hostname.

18. The system of claim 17, wherein each of the new fully qualified hostnames is generated by appending the received hostname, of the type single label hostname, with each domain suffix record on the client computer.

19. The system of claim 18, further comprising:
routing the hostname query to each server on the private network if the hostname is of the type single label hostname;
wherein the hostname query is routed to each server on the private network according to the IP address associated with the domain suffix of the new fully qualified hostname.

20. The system of claim 19, further comprising:
receiving a response to the hostname query from a server;
wherein the response from the server includes either a positive response or a negative response;
wherein no response is determined to be a negative response; and
wherein a positive response includes an IP address that maps to the received hostname query.

21. The system claim 20, wherein the positive response and the negative response are cached in a HOSTS file for a specified time period.

22. The system of claim 20, wherein the response to the hostname query is a duplicate response, wherein the duplicate response is a positive response from two or more servers with replicated applications.

23. The system of claim 22, further comprising:
selecting a preferred IP address if a duplicate response is received.

24. The system of claim 23, further comprising:
identifying, from the two or more servers, the server with the most recently installed replicated application; and
selecting an IP address associated with the most recently installed replicated application as the preferred IP address.

* * * * *